(12) United States Patent
Schroeder

(10) Patent No.: US 8,639,854 B2
(45) Date of Patent: Jan. 28, 2014

(54) NEGOTIATION OF A PROPER COMMUNICATION PROTOCOL BETWEEN A DATA CARRIER AND A READER DEVICE

(75) Inventor: Jürgen Schroeder, Hamburg (DE)

(73) Assignee: NXP B.V., Eindhoven (NL)

( * ) Notice: Subject to any disclaimer, the term of this patent is extended or adjusted under 35 U.S.C. 154(b) by 438 days.

(21) Appl. No.: 12/280,825

(22) PCT Filed: Feb. 6, 2007

(86) PCT No.: PCT/IB2007/050389
§ 371 (c)(1),
(2), (4) Date: Aug. 27, 2008

(87) PCT Pub. No.: WO2007/096794
PCT Pub. Date: Aug. 30, 2007

(65) Prior Publication Data
US 2009/0043918 A1 Feb. 12, 2009

(30) Foreign Application Priority Data
Feb. 27, 2006 (EP) .................... 06110431

(51) Int. Cl.
*G06F 3/00* (2006.01)
*G06F 15/16* (2006.01)
(52) U.S. Cl.
USPC ............... 710/11; 710/8; 710/14; 709/229; 709/237
(58) Field of Classification Search
USPC ............................................... 710/11
See application file for complete search history.

(56) References Cited

U.S. PATENT DOCUMENTS

| | | | | |
|---|---|---|---|---|
| 5,070,233 A | * | 12/1991 | Takizawa et al. | 235/380 |
| 5,798,507 A | | 8/1998 | Kawagishi | |
| 6,138,918 A | * | 10/2000 | Tarbouriech | 235/492 |
| 6,481,629 B1 | * | 11/2002 | Hirabayashi et al. | 235/487 |
| 6,557,754 B2 | * | 5/2003 | Gray et al. | 235/375 |
| 2003/0024984 A1 | * | 2/2003 | Yamasaki | 235/451 |
| 2004/0089725 A1 | * | 5/2004 | Hill | 235/492 |
| 2005/0005045 A1 | * | 1/2005 | Kim et al. | 710/74 |
| 2005/0197017 A1 | * | 9/2005 | Chou et al. | 439/660 |

FOREIGN PATENT DOCUMENTS

| | | |
|---|---|---|
| CN | 1136684 A | 11/1996 |
| CN | 1588440 A | 3/2005 |
| WO | 0231762 A | 4/2002 |

* cited by examiner

*Primary Examiner* — Henry Tsai
*Assistant Examiner* — Dean Phan

(57) ABSTRACT

A method of negotiating a proper communication protocol between a reader device (10) and a data carrier (20) is disclosed. In a first step, when the data carrier (20) is inserted into the reader device (10) at a first point in time (t1), the data carrier (20) provides information to the reader device (10), which communication protocols are supported by the data carrier (20), by means of a binary value (BV). In a next step, the reader device (10) chooses/sets one of the possible communication protocols according to its own capability. This choice is provided to the data carrier (20) by applying a clock signal (CLK) of a certain frequency (f), which is associated with the chosen/set communication protocol, to an input contact (C3) of the data carrier (20) at a second point in time (t2). Finally, the data carrier (20) sets the chosen communication protocol received from the reader device (10), thereby finalizing the negotiation sequence. Subsequently, communication may take place between reader device (10) and data carrier (20) from a fourth point in time (t4).

21 Claims, 3 Drawing Sheets

NEGOTIATION OF A PROPER COMMUNICATION PROTOCOL BETWEEN A DATA CARRIER AND A READER DEVICE

FIELD OF THE INVENTION

The invention relates to a method of negotiating a proper communication protocol between a data carrier and a reader device, wherein the reader device acquires a binary value from the data carrier, with which binary value communication protocols supported by the data carrier are associated, and chooses and sets one of said communication protocols.

Furthermore, the invention relates to a method of negotiating a proper communication protocol between a data carrier and a reader device, wherein the data carrier provides a binary value to the reader device, with which binary value communication protocols supported by the data carrier are associated, thereby requesting the reader device to choose and set one of said communication protocols.

The invention moreover relates to an electric circuit for a reader device, designed to negotiate a proper communication protocol with a data carrier, comprising means for acquiring a binary value from the data carrier, with which binary value communication protocols supported by the data carrier are associated, and means for choosing and setting one of said communication protocols, and the invention also relates to a reader device comprising said electric circuit.

Finally, the invention relates to an electric circuit for a data carrier, designed to negotiate a proper communication protocol with a reader device, comprising means for providing a binary value to the reader device, with which binary value communication protocols supported by the data carrier are associated, thereby requesting the reader device to choose and set one of said communication protocols, and the invention also relates to a data carrier comprising said electric circuit.

BACKGROUND OF THE INVENTION

The ever increasing functional range of present-day devices leads to well known compatibility problems. On the one hand, there is a demand for an increasing functional range, whereas, on the other hand, there is a demand for supporting also older devices. This applies also to the communication between a data carrier and a reader device, which this invention is about. Data carriers are widespread, e.g. in the form of smart cards. Nearly everyone carries a number of smart cards, e.g. access cards, credit cards, loyalty cards, etc., so that there are a lot of smart cards in circulation. More and more data is stored on such data carriers, which leads to problems when use is made of a communication protocol which was designed for a low amount of data. Quite often it turns out that the data rate which was considered to be sufficient in the past, does not fit current demands. So, there is a need for modern, fast communication protocols for data carriers on the one hand, whereas the original communication protocol should be supported as well on the other hand. Hence, a negotiation procedure is needed to decide which communication protocol is to be used. However, this change should be made without influencing the present reader device/smart card infrastructure if possible, which is not an easy task, as data carriers normally have an interface tailored for the original demands, but not for present and future demands. Accordingly, there is normally only a limited number of contacts which may be used for negotiating a communication protocol. One example for an existing data carrier is a smart card compliant with ISO 7816, which today has an interface with eight contacts and a communication protocol for low data rates. One example of an existing (low data rate) protocol is the T=0/T=1 isochronous protocol within the frequencies allowed in ETSI TS 102 221 "Smart Cards; UICC-Terminal interface; Physical and logical characteristics". However, these are just particular examples taken from a vast number of examples. A person skilled in the art will easily understand that it is not possible to provide a complete list of examples and that the problems stated above apply to various other data carriers as well.

It is thus an object of the invention to provide a solution for negotiating a proper communication protocol between a data carrier and a reader device with little or no influence on an existing infrastructure.

OBJECT AND SUMMARY OF THE INVENTION

The object of the invention is achieved by a method as defined in the first paragraph, wherein the reader device in addition applies a clock signal to the data carrier having a frequency associated with the chosen/set communication protocol, which reader device thereby requests said data carrier to set said communication protocol as well.

The object of the invention is furthermore achieved by a method as defined in the second paragraph, wherein the data carrier in addition receives a clock signal from the reader device having a frequency associated with the chosen/set communication protocol, and wherein the data carrier sets the communication protocol associated with said frequency as well.

The object of the invention is also achieved by an electric circuit for a reader device, as defined in the third paragraph, additionally comprising means for applying a clock signal to the data carrier having a frequency associated with the chosen/set communication protocol, which electric circuit thereby requests said data carrier to set said communication protocol as well.

The object of the invention is also achieved by a reader device comprising said inventive electric circuit and an external interface connected thereto.

Furthermore, the object of the invention is achieved by an electric circuit for a data carrier, as defined in the fourth paragraph, additionally comprising means for receiving a clock signal from the reader device having a frequency associated with the chosen/set communication protocol and means for setting the communication protocol associated with said frequency as well.

Finally, the object of the invention is also achieved by a data carrier comprising said inventive electric circuit and an external interface connected thereto.

The invention offers the advantage that negotiating a proper communication protocol is possible with only few changes of the reader devices and data carriers. In a first step, the data carrier provides information to the reader device, which communication protocols are supported by the data carrier, by means of a binary value (in a simple case this means logical "0" and "1" at an output contact of the data carrier). In a next step, the reader device chooses and sets one of the possible communication protocols according to its own capability. This choice is provided to the data carrier by applying a clock signal of a certain frequency, which is associated with the chosen/set communication protocol, to an input contact of the data carrier. Finally, the data carrier sets the chosen communication protocol received from the reader device, thereby finalizing the negotiation sequence. Subsequently, communication may take place between reader device and data carrier according to the negotiated communication protocol.

It is pointed out that the provision of a certain binary value by the smart card does not mean that the smart card thereby sets a certain communication protocol. The smart card rather forces the reader device to choose one of the proposed protocols, while the smart card itself sets the communication protocol when it receives the clock signal from the reader device.

It is further pointed out that, according to the invention, there is no need for a default communication protocol to negotiate a proper communication protocol for a further data transfer, whereas some prior art solutions use a default communication protocol to do so. In such a case, the default communication protocol has to provide commands for the negotiation (which means that an existing communication protocol has to be extended). This is not the case when the invention is used. Negotiation takes place without using a default communication protocol, which is why there is no need to change or extend an existing communication protocol.

Furthermore, there is no danger of applying vague or even dangerous signals when using a common trial and error principle (meaning trying different communication protocols until one is found that works properly). By doing so, it might happen that in different communication protocols a logical "0" (or a logical "1") is represented by different voltage levels. Let us for example assume that "0" ranges from 0V to 1V and "1" from 3V to 5V in communication protocol A and "0" ranges from 0V to 5V and "1" from 7V to 15V in communication protocol B. So, when trying the communication protocol B, a transmitted "0" with 4V is interpreted as "1" in a communication partner which uses communication protocol A by default. Even worse, a "1" in communication protocol B could cause damage in a communication partner which uses communication protocol A, because of the high voltage. Hence, it is very important to negotiate a proper communication protocol, which is advantageously offered by the invention.

In a preferred embodiment, the electric circuit for a reader device (or the reader device itself) comprises an interface compliant with ISO 7816, wherein the programming power output provides the means for acquiring a binary value from the data carrier, and wherein the clock signal output provides the means for applying a clock signal to the data carrier. In addition, the electric circuit for a data carrier (or the data carrier itself) comprises an interface compliant with ISO 7816, wherein the programming power input provides the means for providing a binary value to the reader device, and wherein the clock signal input provides the means for receiving a clock signal from the reader device. As stated before, the invention applies in particular to ISO 7816 systems. Here, a huge infrastructure of reader devices and data carriers (smart cards) exists, which is to be supported also in the future. Moreover, there is only a limited number of contacts (here eight contacts) which might be used or double-used for alternative communication protocols. In this embodiment, the programming power connection and the clock signal are used for said negotiation. No additional contacts and no change of the ISO 7816 communication protocol are needed.

In a further preferred embodiment, the electric circuit for the reader device comprises a pull down resistor between said programming power output and the ground output. The programming power input of an existing ISO 7816 smart card normally is not connected internally and thus not pulled to a certain voltage. By using said pull down resistor, the binary value, which the reader device acquires from an existing ISO 7816 smart card, therefore is "0". A "0" by definition means that the smart card is capable of supporting only the ISO 7816 communication protocol. Thus, a reader device "knows" that the ISO 7816 communication protocol is to be used when receiving a "0".

In yet another preferred embodiment, the electric circuit for the data carrier comprises a pull up resistor between said programming power input and the power input. Here, the voltage at the programming power input of the smart card is pulled to "1", which per definition means that the smart card is capable of supporting the ISO 7816 communication protocol and an alternative communication protocol, e.g. USB or MMC. Said pull up resistor should be designed in such a way that the voltage divider formed by the pull up resistor and the pull down resistor of a reader device provides an unambiguous value (here a clear logical "1").

Finally, it is advantageous if the data carrier comprises means to change the binary value. Going back to the above example, an inventive smart card, which is capable of supporting the ISO 7816 communication protocol and an alternative communication protocol, has the possibility to force the reader device to use the standard ISO 7816 communication protocol. Without such means there is no possibility for a smart card to insist on using an ISO 7816 standard protocol.

These and other aspects of the invention are apparent from and will be elucidated with reference to the embodiments described hereinafter.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
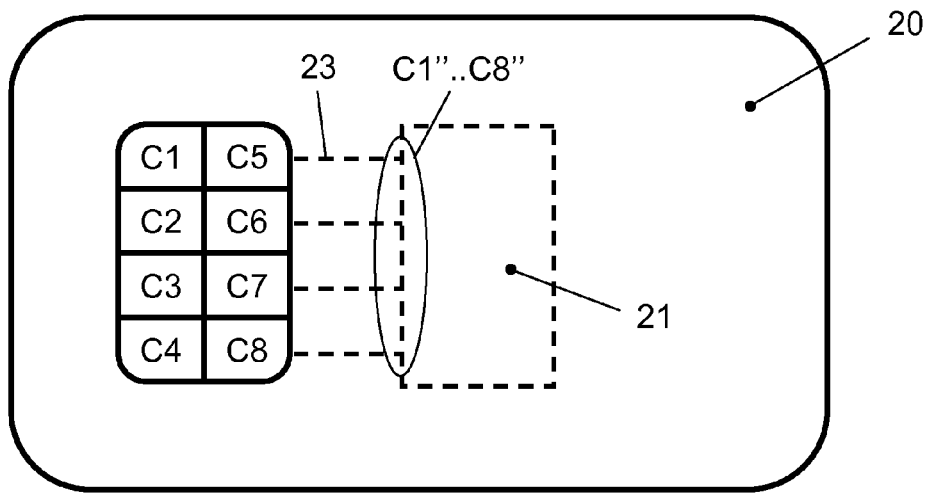
FIG. 1 shows a smart card compliant with ISO 7816.

FIG. 1 shows a data carrier 20 in the form of a smart card, comprising an electric circuit 21 and a card interface, compliant with ISO 7816, connected thereto by means of lines 23 (just 4 lines are shown). The circuit interface as well as the card interface each comprises eight contacts C1" ... C8" and C1 ... C8, respectively, whose function is described below:

| Contact | Designation | Description |
|---|---|---|
| C1 | VCC | Power connection (supply voltage) through which operating power is supplied to smart card |
| C2 | RST | Reset line through which the reader device can signal to the smart card to initiate its reset sequence of instructions |
| C3 | CLK | Clock signal line through which a clock signal can be provided to the smart card. This line controls the operation speed and provides a common framework for data communication. |
| C4 | RFU | Reserved for future use |
| C5 | GND | Ground line providing common electrical ground between reader device and smart card |
| C6 | VPP | Programming power connection used to program the smart card |
| C7 | I/O | Input/output line that provides a half-duplex communication channel between the reader device and the smart card |
| C8 | RFU | Reserved for future use |

Figure 2:
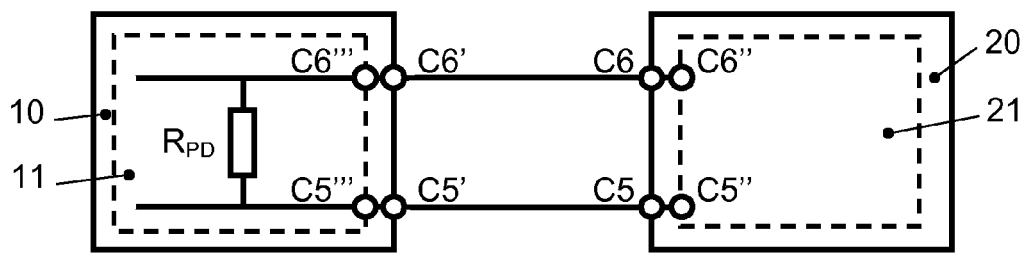
FIG. 2 shows a reader device in communication with the smart card.

FIG. 2 shows a reader device 10 in communication with the smart card 20. For the sake of brevity, just the contacts C5 and C6 of the smart card 20 are shown, which are connected to the associated contacts C5' and C6' of the reader device 10. In FIG. 2, the contacts C5' and C6' of the reader device 10 are shown spaced from the contacts C5 and C6 of the smart card 20. However, in reality there is physical contact between reader contacts C5' and C6' and card contacts C5 and C6 when the smart card 20 is inserted into a reader device 10.

In addition, an electric circuit 11 of the reader device 10, in the following also referred to as "reader circuit", is shown in FIG. 2. The reader circuit 11 comprises an interface with eight contacts C1'" . . . C8'" (only C5'" and C6'" are shown), which are connected with the contacts C1' . . . C8' (only C5' and C6' are shown) of the interface of the reader device 10. Similarly, an electric circuit 21 of the data carrier 20, in the following also referred as "carrier circuit" or "card circuit", is shown in FIG. 2. The carrier circuit 21 comprises an interface with eight contacts C1" . . . C8" (only C5" and C6" are shown), which are connected with the contacts C1 . . . C8 (only C5 and C6 are shown) of the interface of data carrier 20. Note that the voltage or the current at each contact C5, C5', C5", and C5'" is identical, as they are directly connected to one another when the card is inserted. This applies also to the other contacts Cx, Cx', Cx", and Cx'", so that in the following reference to one contact also means reference to the related contacts.

According to a preferred embodiment of the invention, a pull down resistor $R_{PD}$ is arranged between the contacts C5'" and C6'" in the reader circuit 11. Since the programming power connection C6 normally is not wired inside the smart card 20, the voltage at contact C6'" is at a logical low level ("0") when the smart card 20 is inserted into a reader device 10. This logical value is evaluated in the reader circuit 11. In this particular example, "0" means that the smart card 20 is just capable of running the standard ISO 7816 communication protocol. Accordingly, the reader device 10 is not allowed to use another communication protocol, e.g. a high speed communication protocol. In this case, there is no choice for the reader device 10, which means that the list of possible communication protocols provided by the smart card 20 has just one entry.

Figure 3:
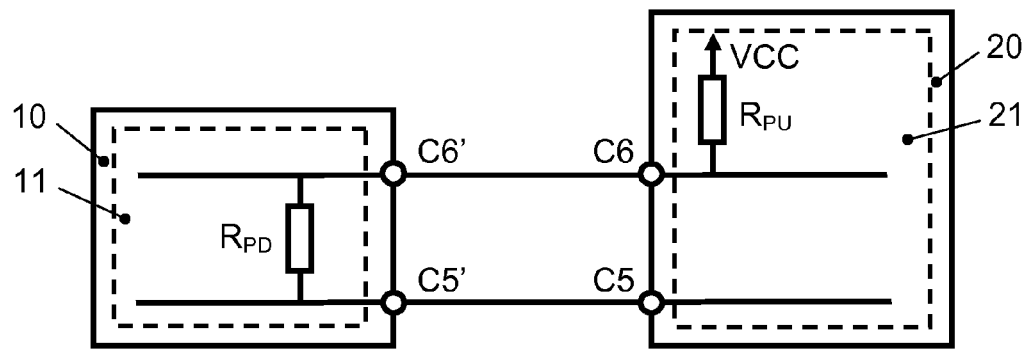
FIG. 3 shows a reader device in communication with a second embodiment of a smart card.

FIG. 3 shows a reader device 10 in communication with the smart card 20, similar to the one of FIG. 2 (contacts C5", C6", C5'", and C6'" are not shown). In contrast to FIG. 2, the programming power connection C6 is pulled to a high logical value ("1") in the smart card 20 by means of a pull up resistor $R_{PU}$ between programming power connection C6 and the power input C1 (or generally the supply voltage VCC). Accordingly, the reader device 10 recognizes a "1" when the smart card 20 is inserted into the reader device 10. In this particular example, "1" means that the smart card 20 is not only capable of running the standard ISO 7816 communication protocol, but is also designed to communicate according to other protocols, e.g. a high-speed data communication protocol. Accordingly, the reader device 10 may choose and set the ISO 7816 communication protocol or a high-speed communication protocol. In the following, timing diagrams show the different possibilities of switching a particular communication protocol.

Figure 4:
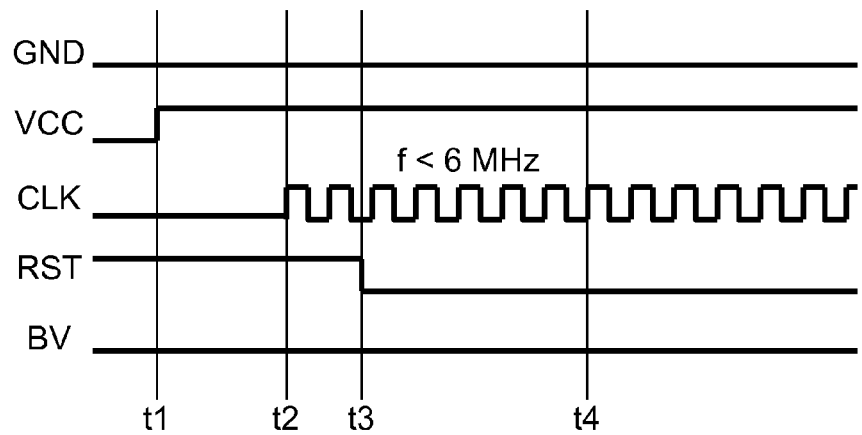
FIG. 4 shows a timing diagram where the smart card allows only the use of the ISO 7816 protocol.

FIG. 4 shows a case where the smart card 20 only allows the use of the ISO 7816 protocol. Five signals are shown: ground GND at contact C5, supply voltage VCC at contact C1, a clock signal CLK at contact C3, a reset signal RST at contact C2, and a binary value BV at contact C6 (note that just the smart card contacts are referenced). First of all, the smart card 20 is inserted into a reader device 10 at a first point in time t1. Subsequently, the smart card 20 is powered by ground GND and the supply voltage VCC of the reader device 10. The binary value BV is "0" in this example, meaning that the smart card 20 provides just the communication protocol according to ISO 7816. That is why the reader device 10 chooses/sets the communication protocol to ISO 7816 and provides a clock signal CLK of an associated frequency f at a second point in time t2. In this particular example, a frequency f below 6 MHz means that the reader device 10 has chosen the ISO 7816 communication protocol, a frequency f above 6 MHz means that the reader device 10 has chosen an alternative communication protocol. In the configuration shown in FIG. 4, the reader device 10 has to "choose" the ISO 7816 communication protocol, as the smart card 20 is not capable of supporting another communication protocol. Accordingly, a clock signal CLK with a frequency f below 6 MHz is fed into the smart card 20 via the contact C3. The smart card 20 detecting a clock signal CLK with a frequency f below 6 MHz sets the ISO 7816 communication protocol as well. Finally, the reader device 10 sets the reset signal RST to "0" at a third point in time t3. After a fourth point in time t4, the reset sequence is finished, so that data communication according to the chosen protocol is enabled from this point in time. Note that 6 MHz is an arbitrary choice for a threshold frequency in this particular example. It will of course be clear to those skilled in the art that other frequencies are equally applicable.

It should further be noted at this point that the provision of a certain binary value BV (here a logical "0") by the smart card 20 does not mean that the smart card 20 thereby sets a certain communication protocol. The smart card 20 rather forces the reader device 10 to choose the ISO 7816 communication protocol in this example, whereas the smart card 20 itself sets the communication protocol when it receives a clock signal CLK of a certain frequency f.

It should finally be noted that there is no default communication protocol for negotiating a proper communication protocol for data transfer. Some prior art solutions use a default communication protocol (which could be an extended ISO 7816 communication protocol here) to negotiate a communication protocol for a further data transfer. In such a case, the default communication protocol has to provide commands for the negotiation. This is not the case here. Negotiation takes place without using a default communication protocol, which is why there is no need to change or extend the existing ISO 7816 protocol.

Figure 5:
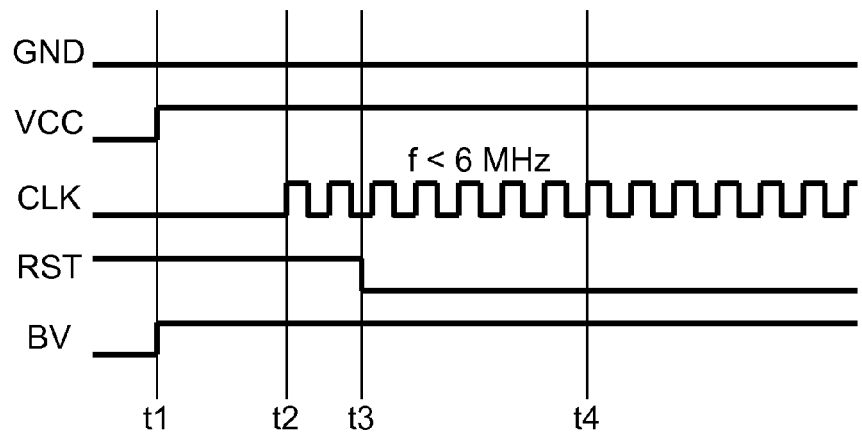
FIG. 5 shows a timing diagram where the smart card allows the use of the ISO 7816 protocol and an alternative communication protocol.

FIG. 5 shows another negotiation sequence quite similar to the one shown in FIG. 4. In the example of FIG. 5, however, the binary value BV at contact C6 is "1", meaning that the smart card 20 provides a communication protocol according to ISO 7816 and, in addition, another communication protocol like a high-speed communication protocol (e.g. USB or MMC). That is why the reader device 10 has a real choice between the communication protocol to ISO 7816 and a high-speed communication protocol. It is assumed that the reader device 10 "chooses" the ISO 7816 protocol, as the reader device 10 itself is not capable of using another communication protocol (so again there is no real choice in this particular case). Accordingly, the reader device 10 provides a clock signal CLK of a frequency f below 6 MHz to the smart card 20 via the contact C3. The smart card 20 detecting a clock signal CLK with a frequency f below 6 MHz sets the ISO 7816 communication protocol as well. Finally, the reader device 10 sets the reset signal RST to "0" so as to start a reset sequence. When this sequence is finished, data communication according to the chosen protocol is enabled.

Figure 6:
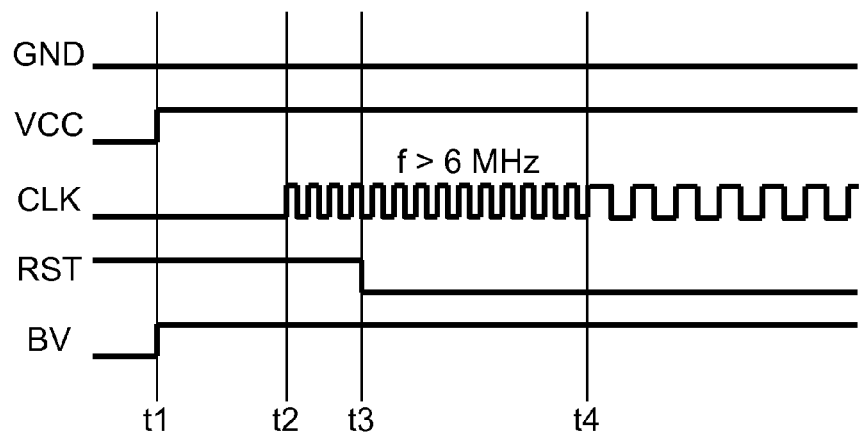
FIG. 6 shows a timing diagram where the reader device chooses the use of an alternative communication protocol.

FIG. 6 finally shows a case where an alternative communication protocol is chosen. Again, like in FIG. 5, the binary value BV at contact C6 is "1". Unlike FIG. 5, however, it is assumed that the reader device 10 is capable of communicating in compliance with a high-speed data protocol. Accordingly, the reader device 10 provides a clock signal CLK of a frequency f above 6 MHz to the smart card 20 via the contact C3. The smart card 20 detecting a clock signal CLK with a frequency f above 6 MHz now sets the high-speed communication protocol as well. Finally, the reader device 10 sets the reset signal RST to "0" so as to start a reset sequence. When this sequence is finished, data communication according to the chosen high-speed protocol is enabled. FIG. 6 also shows that using a frequency f>6 MHz for switching to an alternative communication protocol does not necessarily mean that this particular frequency f is also used for data communication. It is rather conceivable that a lower frequency f (as shown in FIG. 6) or a higher frequency f may be chosen. This possibility in principle also applies to the protocol, which is switched with a frequency f<6 MHz.

If the alternative or high-speed communication protocol is a USB communication protocol (Universal Serial Bus), two wires are needed for data transmission because of the so-called differential data transmission. On one wire, data is transmitted in a normal way, on the other the inverse data is transmitted so as to increase the electromagnetic compatibility (EMC). Thus, contact C6 is used for the positive data signal, contact C7 for the inverse signal or vice versa. Accordingly, contact C6 (which was originally intended as a programming power connection) is used for negotiating a communication protocol between time t1 and time t4, and afterwards for data transmission (not shown in FIG. 6). USB 2.0 currently provides a data rate of maximally 480 Mbit/s.

The table below shows a possible assignment of the USB pins to the contacts of an ISO 7816 interface

| USB Pin | Name | Description | ISO 7816 interface |
| --- | --- | --- | --- |
| 1 | VCC | +5 V | C1 |
| 2 | D− | Data− | C6 (C7) |
| 3 | D+ | Data+ | C7 (C6) |
| 4 | GND | Ground | C5 |

Alternatively, an MMC communication protocol (Multi Media Card) can be used as an alternative or high-speed communication protocol, see table below, which shows a possible assignment of the MMC pins to the contacts of an ISO 7816 interface. MMC currently provides a data rate of around 1 Mbyte/s.

| MMC Pin | Name | Description | ISO 7816 interface |
| --- | --- | --- | --- |
| 1 | Reserved | Not connected | — |
| 2 | CMD | Command/Response | C6 |
| 3 | VSS1 | Supply voltage ground | C5 |
| 4 | VDD | Supply voltage | C1 |
| 5 | CLK | Clock | C3 |
| 6 | VSS2 | Supply voltage ground | C5 |
| 7 | DAT0 | Data channel 0. | C7 |

Although only two concrete examples of alternative communication protocols have been shown, it is clear to one skilled in the art that the invention applies to a great number of existing protocols, including: Fire Wire, compact flash, memory stick, smart media, secure digital, etc. It is pointed out that contacts C6 and C7 may also be used for simultaneous bi-directional 2-wire communication, meaning that one line is used for data in, the other one for data out. Preferably, a clock signal should also be provided for the alternative communication protocols (via contact C3) so as to reduce problems especially at higher data rates. Finally, a reset line should be supported to offer the possibility to recover from problems of the smart card 20 (via contact C2).

A further possibility is to extend an ISO 7816 smart card with a contactless interface by using contacts C4 and C8 for an antenna connection. As the present invention preferably does not use these contacts C4 and C8 (which however were intended for future use!) this possibility is still left open.

As shown, the present invention offers the advantage to use high-speed communication protocols like USB or MMC for updated reader devices 10 and smart cards 20 compliant with ISO 7816. However, reader devices 10 and smart cards 20 capable of running only ISO 7816 may be used as well, since the inventive system is fully downwardly compatible. If a standard smart card 20 is put into an inventive reader device 10, the smart card 20 forces the reader device to use ISO 7816, as shown in FIG. 4. If an inventive smart card 20 is put into an existing reader device 10, the reader device 10 forces the smart card 20 to use ISO 7816 as well (see FIG. 5). Only if an inventive smart card 20 is put into an inventive reader device 10, an alternative communication protocol may be chosen, as shown in FIG. 6. It should be noted that the use of an alternative communication protocol is not mandatory, even if both the reader device 10 and the smart card 20 are capable of running such an alternative protocol. It is also possible that inventive devices use the ISO 7816 standard.

It is pointed out that existing devices strictly speaking do not "set" a particular communication protocol. They rather behave as usual. For instance, an existing ISO 7816 smart card does not "guess" as to whether it is inserted into an inventive reader device 10. Hence, it does not set a communication protocol, but just uses it. The same applies to an existing reader device, which does not guess as to whether an inventive smart card 20 is inserted. It also does not set the communication protocol, but just applies a clock signal CLK with a frequency f below 6 MHz (as defined in ISO 7816).

Figure 7:
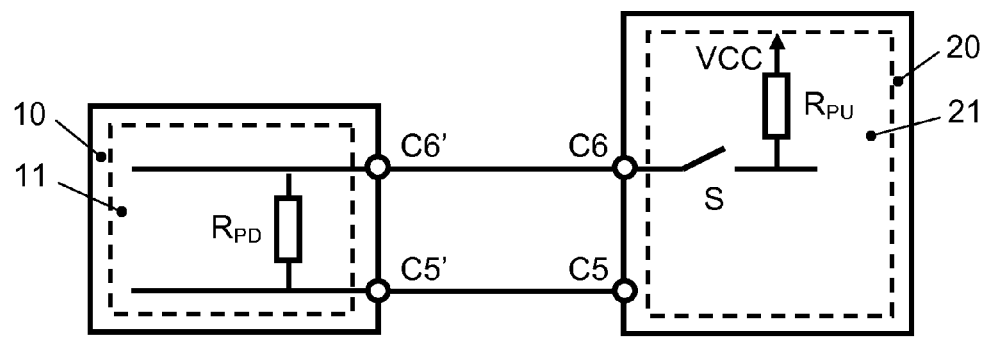
FIG. 7 shows a reader device in communication with a third embodiment of a smart card.

In a further advantageous embodiment, the smart card 20 is capable of switching communication protocols by toggling the binary value BV. FIG. 7 shows an arrangement similar to the one of FIG. 3, where, in addition, a switch S controlled by a logic (not shown) is provided in the smart card 20 to toggle the binary value BV between "0" and "1" so as to force the reader device 10 to choose ISO 7816 (when BV="0") or leave the decision up to the reader (when BV="1"). In this embodiment, the contact C6 is pulled to VCC or is unconnected, dependent on the state of the switch S.

Figure 8:
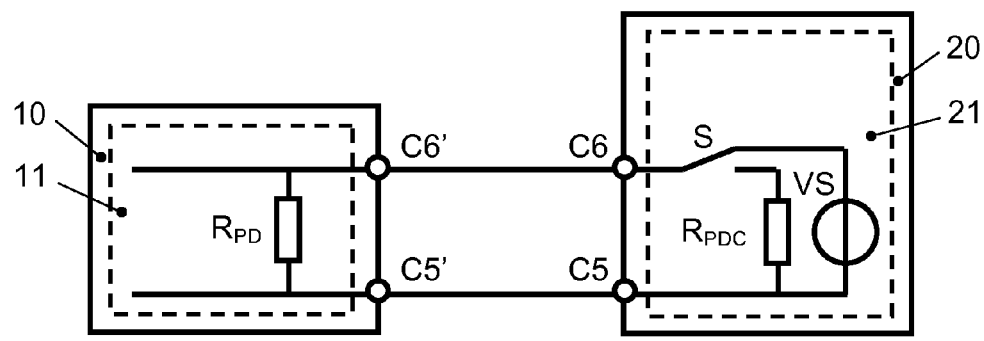
FIG. 8 shows a reader device in communication with a fourth embodiment of a smart card.

FIG. 8 shows another similar arrangement where, dependent on the state of a switch S, a voltage from a voltage source VS is provided to contact C6 or the voltage on contact C6 is pulled to ground GND by means of a pull down resistor $R_{PDC}$ in the smart card 20.

Figure 9:
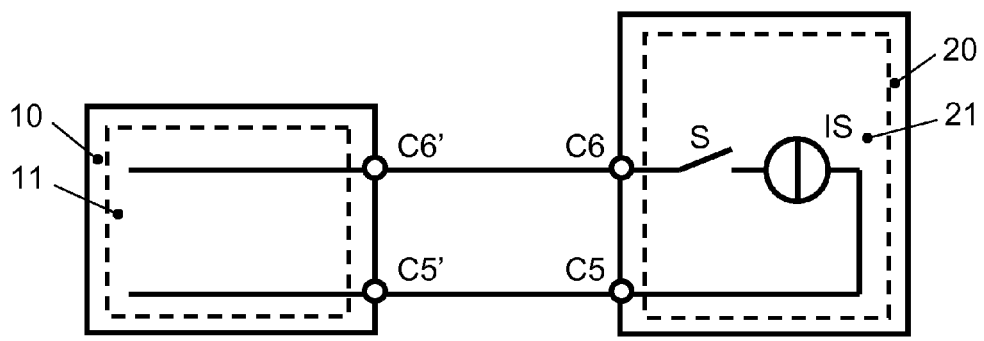
FIG. 9 shows a reader device in communication with a fifth embodiment of a smart card.

Finally, FIG. 9 shows an arrangement where the binary value BV is represented by a certain level of a current. In this particular embodiment, the current source IS feeds a current into contact C6 when the switch S is closed. The occurrence of a certain level of the current is interpreted in the reader device 10 as a logical "1".

One skilled in the art will of course appreciate that the solutions shown in the Figures are just exemplary embodiments of the invention. Although the provision of a certain binary value BV is shown only by means of a voltage or a level of a current, it is also conceivable that the intensity of light (when transmitting data optically) is used to provide a binary value BV. It is also clear to one skilled in the art that the pull down resistors $R_{PD}$, $R_{PDC}$ and the pull up resistor $R_{PU}$ and the voltage source VS are just exemplary embodiments to set a certain binary value BV by means of a voltage level. Instead of resistors, transistors are applicable as well. In particular, when the inventive function is provided by an integrated electronic circuit (which is normally the case when talking about smart cards), the use of transistors (e.g. FETs) is advantageous, because they are smaller than resistors and easier to make. One skilled in the art will furthermore appreciate that the association of a certain voltage or current level with a binary value BV may be different from the one shown in the Figures, meaning that positive and negative logic are equally applicable. The aim of the invention is to provide the negotiation algorithm with a minimum number of contacts Cx. Nevertheless, it is possible to use more than one contact Cx, that is to say bits, to define a binary value BV. Finally, it is also conceivable to extend the binary values BV, meaning that a higher number of values (not only "0" and "1") may be associated with certain voltage or current levels. For example, there may be three different voltage levels representing the values "0", "1", and "2". In a similar way it is also possible to use more than one threshold level for the frequency f of the clock signal CLK to offer the choice of more than two communication protocols. For example, there might be a first communication protocol associated with frequencies f=0 to 4 MHz, a second one associated with frequencies f=5 to 7 MHz, and a third one associated with frequencies f>8 MHz.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method of negotiating a proper communication protocol between a data carrier and a reader device, the method comprising the steps of:
    the reader device acquiring a binary value from the data carrier, the binary value indicating a plurality of communication protocols supported by the data carrier, each of the plurality of communication protocols corresponding to a respective frequency,
    the reader device choosing and setting one of said plurality of communication protocols, and
    the reader device applying a clock signal to the data carrier having a frequency exclusive to said one of the plurality of communication protocols, said reader device thereby requesting said data carrier to set said communication protocol as well,
    wherein the reader device acquires another binary value that identifies, and results in setting the reader device to, said one of the plurality of communication protocols for communication via said one of the plurality of communication protocols and the respective frequency corresponding thereto.

2. A method of negotiating a proper communication protocol between a data carrier and a reader device, the method comprising the steps of:
    the data carrier providing a binary value to the reader device, the binary value indicating a plurality of communication protocols supported by the data carrier, thereby requesting the reader device to choose and set one of said communication protocols, each of the plurality of communication protocols corresponding to a respective frequency,
    the data carrier receiving a clock signal from the reader device having the frequency-exclusive to said communication protocol set, and
    the data carrier setting the communication protocol corresponding to said frequency as well,
    wherein the reader device acquires another binary value that identifies, and results in setting the reader device to, said one of the plurality of communication protocols for communication via said one of the plurality of communication protocols and the respective frequency corresponding thereto.

3. An electric circuit for a reader device, designed to negotiate a proper communication protocol with a data carrier, said electric circuit comprising:
    means for acquiring a binary value from the data carrier, the binary value indicating a plurality of communication protocols supported by the data carrier, each of the plurality of communication protocols corresponding to a respective frequency;
    means for choosing and setting one of said communication protocols, and means for applying a clock signal to the data carrier having the frequency exclusive to said communication protocol set, said electric circuit thereby requesting said data carrier to set said communication protocol as well, wherein the reader device acquires another binary value that identifies, and results in setting the reader device to, said one of the plurality of communication protocols for communication via said one of the plurality of communication protocols and the respective frequency corresponding thereto.

4. An electric circuit as claimed in claim 3, further comprising an interface compliant with ISO 7816, wherein a programming power output provides the means for acquiring at least one of the binary values from the data carrier, and wherein a clock signal output provides the means for applying the clock signal to the data carrier.

5. An electric circuit as claimed in claim 4, further comprising a pull down resistor between said programming power output and the ground output.

6. A reader device, comprising an electric circuit as claimed in claim 3 and an external interface connected thereto.

7. An electric circuit for a data carrier, designed to negotiate a proper communication protocol with a reader device, said electric circuit comprising:

means for providing a binary value to the reader device, the binary value indicating a plurality of communication protocols supported by the data carrier, thereby requesting the reader device to choose and set one of said communication protocols, each of the plurality of communication protocols corresponding to a respective frequency, means for receiving a clock signal from the reader device having a frequency exclusive to said communication protocol set, and means for setting the communication protocol corresponding to said frequency as well, wherein the reader device acquires another binary value that identifies, and results in setting the reader device to, said one of the plurality of communication protocols for communication via said one of the plurality of communication protocols and the respective frequency corresponding thereto.

8. An electric circuit as claimed in claim 7, comprising an interface compliant with ISO 7816, wherein a programming power input provides the means for providing at least one of the binary values to the reader device, and wherein a clock signal input provides the means for receiving the clock signal from the reader device.

9. An electric circuit as claimed in claim 8, comprising a pull up resistor between said programming power input and a power input.

10. An electric circuit as claimed in claim 7, comprising means to change at least one of the binary values.

11. A data carrier, comprising an electric circuit as claimed in claim 7 and an external interface connected thereto.

12. The method of claim 1, wherein the plurality of communication protocols supported by the data carrier includes more than two communication protocols.

13. The method of claim 1, wherein each of the plurality of communication protocols specifies voltage levels corresponding to logical 0 and logical 1.

14. The method of claim 1, wherein the data carrier is further configured and arranged to toggle at least one of the binary values to force the reader device to choose one of the plurality of communication protocols supported by the data carrier.

15. The method of claim 2, wherein the data carrier is further configured and arranged to toggle at least one of the binary values to force the reader device to choose one of the plurality of communication protocols supported by the data carrier.

16. The electric circuit of claim 3, wherein the data carrier is further configured and arranged to toggle at least one of the binary values to force the reader device to choose one of the plurality of communication protocols supported by the data carrier.

17. The electric circuit of claim 7, wherein the data carrier is further configured and arranged to toggle at least one of the binary values to force the reader device to choose one of the plurality of communication protocols supported by the data carrier.

18. An electric circuit for a data carrier, designed to negotiate a proper communication protocol with a reader device, the electric circuit comprising:

means for providing a binary value to the reader device, the binary value indicating a plurality of communication protocols supported by the data carrier, wherein toggling the binary value forces the reader device to choose and set one of said communication protocols, each of the plurality of communication protocols corresponding to a respective frequency, means for receiving a clock signal from the reader device having a frequency exclusive to said communication protocol set, and means for setting the communication protocol corresponding to said frequency.

19. The electric circuit of claim 18, wherein one of the plurality of communication protocols is ISO 7816 corresponding to a frequency above 6 MHz.

20. The electric circuit of claim 18, wherein one of the plurality of communication protocols is an alternative protocol corresponding to a frequency below 6 MHz.

21. The method of claim 1, wherein the frequency of the clock signal exclusive to said one of the plurality of communication protocols is different than a frequency at which said one of the plurality of communication protocols communicates data.

* * * * *